United States Patent
Pamley et al.

(10) Patent No.: US 9,645,954 B2
(45) Date of Patent: May 9, 2017

(54) EMBEDDED MICROCONTROLLER AND BUSES

(71) Applicant: Lenovo (Singapore) Pte. Ltd., Singapore (SG)

(72) Inventors: Marc Richard Pamley, Durham, NC (US); Omar Ali Ali, Morrisville, NC (US); Alan Ladd Painter, Cary, NC (US); Bryan L. Young, Apex, NC (US); William Fred Keown, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 272 days.

(21) Appl. No.: 14/297,485

(22) Filed: Jun. 5, 2014

(65) Prior Publication Data
US 2015/0356034 A1    Dec. 10, 2015

(51) Int. Cl.
*G06F 13/36* (2006.01)
*G06F 13/16* (2006.01)
*G06F 13/42* (2006.01)
*G06F 13/40* (2006.01)

(52) U.S. Cl.
CPC ...... *G06F 13/1684* (2013.01); *G06F 13/4027* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 4,953,165 A | * | 8/1990 | Jackson | G06F 11/22 714/44 |
| 2005/0283661 A1 | * | 12/2005 | Wong | G06F 11/0742 714/12 |
| 2006/0277401 A1 | * | 12/2006 | Sultenfuss | G06F 15/7864 713/1 |
| 2008/0082840 A1 | | 4/2008 | Kendall | |
| 2008/0313319 A1 | | 12/2008 | Geffin | |
| 2009/0024858 A1 | * | 1/2009 | Hijazi | G06F 1/30 713/323 |
| 2009/0100194 A1 | | 4/2009 | Bhadri | |
| 2009/0164690 A1 | | 6/2009 | Slaight | |
| 2010/0090796 A1 | * | 4/2010 | Perez | E06B 9/68 340/5.7 |
| 2010/0205463 A1 | | 8/2010 | Magnusson | |
| 2011/0145445 A1 | * | 6/2011 | Malamant | G06F 1/3203 710/16 |

(Continued)

OTHER PUBLICATIONS

Intel, Low Pin Count (LPC) Interface Specification, 2002 (54 pages).

(Continued)

*Primary Examiner* — Elias Mamo
(74) *Attorney, Agent, or Firm* — Brian J. Pangrle

(57) ABSTRACT

A system can include a power supply unit; a processor; memory operatively coupled to the processor; a chipset operatively coupled to the processor; diagnostic information memory; and a microcontroller operatively coupled to the chipset via a first diagnostic data transfer bus and the microcontroller operatively coupled to the power supply unit and to the diagnostic information memory via a second diagnostic data transfer bus.

18 Claims, 8 Drawing Sheets

(56) References Cited

U.S. PATENT DOCUMENTS

2012/0017011 A1    1/2012  Edwards
2013/0111272 A1*   5/2013  Raz-Pelleg ........... G06F 11/008
                                                            714/40

OTHER PUBLICATIONS

Nuvoton, Current-Limited, Power Distribution Switches NCT3520W, 2012 (22 pages).
Atmel, 8-megabit 2.7-volt Minimum SPI Serial Flash Memory AT26DF081A, 2009 (40 pages).
Dallas Semiconductor, Maxim, DS28CZ04, 4Kb I2C/SMBus EEPROM w/Nonvolatile PIO, 2008 (22 pages).
Nuvoton, NCT6102D / NCT6106D, LPC I/O, 2012 (455 pages).
Lenovo ThinkStation User Guide, 2012 (134 pages).
System Management Bus (SMBus) Specification, Version 2.0, Aug. 3, 2000 (59 pages).
NXP Semiconductor, UM10204, I2C-bus Specification and User Manual, Rev. 6, Apr. 4, 2014 (64 pages).
Lenovo ThinkStation Hardware Maintenance Manual, 2012 (184 pages).
Emerson, LCM600 Series, Technical Reference Note, 2008 (48 pages).
Intel, C600 Series Chipset and Intel X79 Express Chipset, Apr. 2013 (956 pages).
Tyan, S5535/S5535-HE, Version 1.0a, 2013 (100 pages).

* cited by examiner

EMBEDDED MICROCONTROLLER AND BUSES

TECHNICAL FIELD

Subject matter disclosed herein generally relates to technologies and techniques for computers.

BACKGROUND

A computer may establish an operating system runtime environment for execution of applications. Such an environment may be a host system environment (e.g., an in-band environment) that relies on a processor (e.g., a CPU) and memory accessibly by the processor. Where an error occurs in a host system (e.g., an OS runtime environment), a computer may hang and require resetting via user intervention (e.g., powering off and on, etc.). Various technologies and techniques described herein may, for example, perform tasks in an out-of-band manner, which may enhance host system operation.

SUMMARY

A system can include a power supply unit; a processor; memory operatively coupled to the processor; a chipset operatively coupled to the processor; diagnostic information memory; and a microcontroller operatively coupled to the chipset via a first diagnostic data transfer bus and the microcontroller operatively coupled to the power supply unit and to the diagnostic information memory via a second diagnostic data transfer bus. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
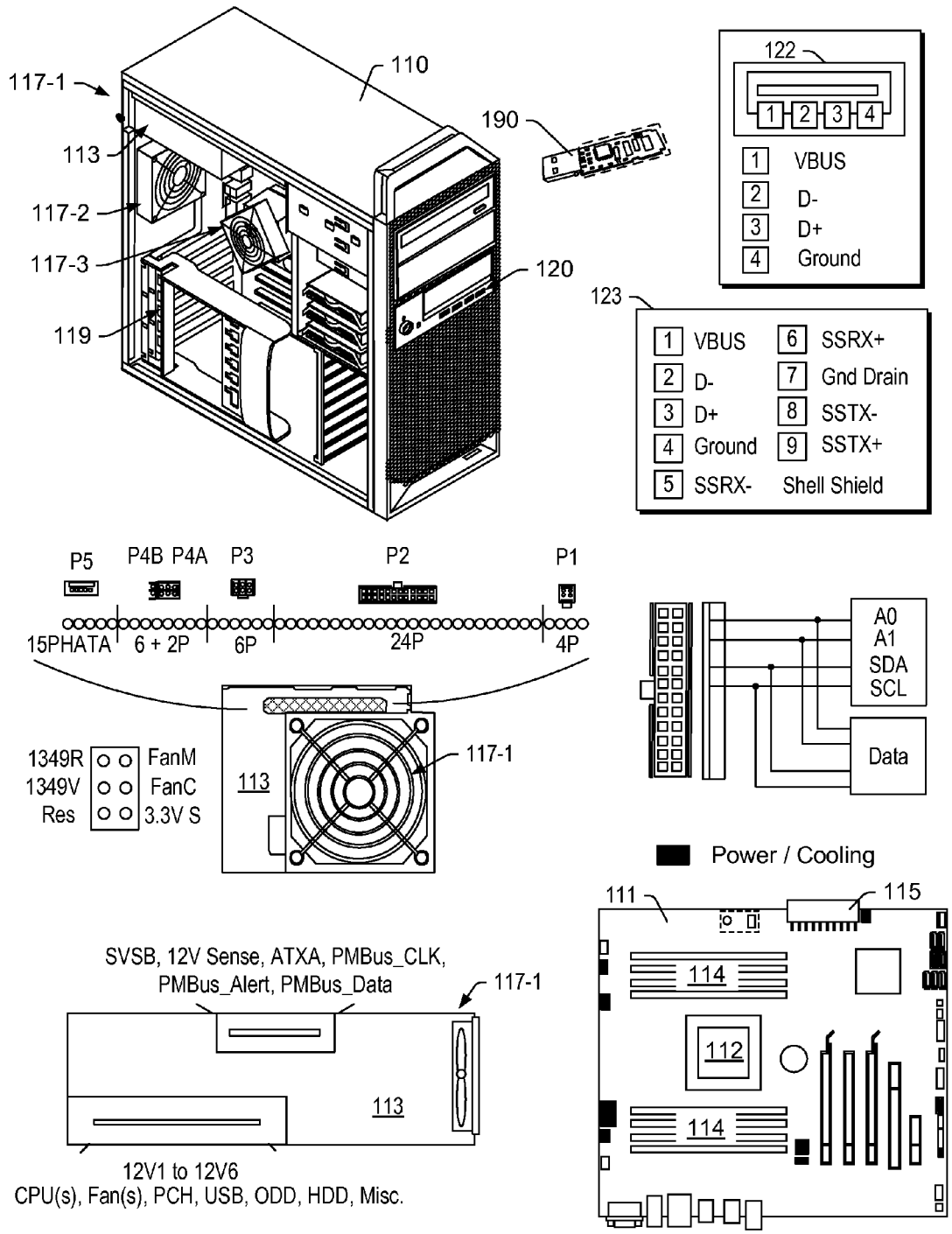
FIG. 1 is a diagram of an example of a computer, examples of components thereof and an example of a device that may be operatively coupled to the computer.

FIG. 1 shows an example of a computer 110 and examples of components such as a circuit board 111, a processor 112, a power supply unit (PSU) 113, memory 114 operatively coupled to the processor 112, a PSU connector 115, a fan 117-1, a fan 117-2, a fan 117-3, adapter card slots 119, and ports 120, which may include one or more USB ports 122. As an example, a USB port may be configured according to one or more specifications, for example, FIG. 1 shows an example of a four contact arrangement and a nine contact arrangement 123 (e.g., a SuperSpeed pin arrangement).

As an example, a device 190 may include a connector that allows for connection of the device 190 to the computer 110 via one or more of the ports 120 (e.g., via a USB port). As an example, the device 190 may include circuitry. As an example, the device 190 may include memory. As an example, the device 190 may include a power source and/or may be powered via connection of the device 190 to a port.

As shown in the example of FIG. 1, the circuit board 111 may include various connectors associated with power and/or cooling as indicated by black, filled blocks. As an example, the circuit board 111 may be a motherboard of the computer 110.

As an example, the PSU 113 may include one or more types of connectors and optionally internal circuitry that includes one or more connections to a connector or connectors. As an example, the PSU 113 may include control circuitry, data circuitry and communication circuitry. For example, the PSU 113 may be optionally configured with circuitry that can implement an I2C communication protocol (e.g., an inter integrated circuit protocol). Such circuitry may provide for data signals and clock signals. As an example, such circuitry may be operatively coupled to an I2C bus, a system management bus (SMBus bus), a power management bus (PMBus bus), etc. As an example, various components of the computer 110 may be operatively coupled to an I2C bus, a SMBus bus and/or a PMBus bus; noting that a SMBus bus and a PMBus bus may be operative in a manner that includes using various features of an I2C bus.

As shown, circuitry of the PSU 113 may include a SDA line and a SCL line as to I2C data and clock signals, respectively, which may be coupled to pins of a connector (e.g., pins that may be internally pulled up to internal voltage of about 3.3V and including a link to resistor of about 4.7K ohm). While the example of FIG. 1 shows lines A0 and A1, an additional line A2 may be included. Such lines may be suitable for implementation of I2C address bit signals (e.g., BIT 0, BIT1, BIT2 signals) and operatively coupled to pins of a connector of the PSU 113. As an example, address lines may allow for defining one or more PSU addresses (e.g., for flied replaceable unit (FRU) data, PMBus data communication, etc.). As an example, for I2C communication between an I2C host and a power supply, the I2C host may be the master and the power supply a slave (e.g., an addressable slave on an I2C bus).

As shown in FIG. 1, various examples of connectors may be implemented with respect to the PSU 113. The various connectors may be associated with wires, which may include a group of five wires (e.g., 15PHATA), a group of 8 wires (e.g., 6+2P), a group of 6 wires (e.g., 6P), a group of 24 wires (e.g., 24P), and a group of 4 wires (e.g., 4P). As an example, the PSU 113 may connect via one or more edge connectors. As shown in FIG. 1, a connector may be a multi-voltage connector (e.g., voltages 1 to 6), for example, to power various components of a motherboard. As an example, a connector may be for various components of a system, for example, components that may be carried within a housing and operatively coupled to one or more components of a motherboard. As an example, consider a connector that can provide power to a graphics sub-system (e.g., with one or more GPUs). As an example, a connector may include contacts for a bus such as a PMBus (e.g., consider a PMBus clock contact, a PMBus alert contact and a PMBus data contact).

Also shown in FIG. 1 is a connector that can include IEEE-1349 standard connections (e.g., pins) and, for example, fan-related and voltage-related connections. For example, a FanC signal may be an optional fan speed and shutdown control signal associated with the labeled FanC connection where fan speed and shutdown may be controllable via a variable voltage. In such an example, a signal may allow for control of the fan 117-1 of the PSU 113 (e.g., full speed to off). As to a FanM signal, it may be associated with the labeled FanM connection. As an example, consider a pulse or multi-pulse per revolution tachometer signal from the fan 117-1 of the PSU 113. Such a signal may allow for monitoring of the PSU 113 for fan speed, failures, etc. In a feedback mechanism, ramping up and/or ramping down of speed of the fan 117-1 may be possible.

As an example, the PSU 113 may include one or more connections for connection to a voltage regulator module (VRM), which may be within the computer 110, optionally operatively coupled to the circuit board 111 (e.g., with a connector coupled to the circuit board 111). As an example, the PSU 113 may include an 8 pin connector (e.g., 2×4) according to an ATX standard that may be operatively coupled to a VRM.

As an example, a port can include a physical and an electrical interface. As an example, consider the port 122 shown in FIG. 1, which includes four electrical interface contacts, labeled "VBUS", "D−", "D+" and "Ground" (GND). Where the port 122 is configured according to a USB specification, signal and power transfers may occur via a four-wire mechanism (e.g., a cable, etc.). In such an example, signaling may occur over two wires. As an example, data may be transferred at rates that are defined with respect to speed. For example, consider a USB high-speed signaling bit rate of 480 Mb/s, a USB full-speed signaling bit rate of 12 Mb/s and a limited capability low-speed signaling mode of 1.5 Mb/s. As an example, a clock signal may be transmitted, encoded along with differential data and a SYNC field may precede a packet to allow a receiver(s) to synchronize a bit recovery clock.

As indicated in the example port 122 of FIG. 1, VBUS and GND electrical interface contacts may be utilized to transfer power (e.g., to deliver power to a device). In such an example, VBUS may be nominally about +5 V at a source. As an example, according to a USB specification, a cable segment with a length of up to several meters may be utilized for delivery of power. As an example, to provide guaranteed input voltage levels and proper termination impedance, biased terminations may be implemented at each end of a cable. Such termination may permit detection of attach (e.g., connect) and detach (e.g., disconnect) at a port and, for example, may differentiate between high/full-speed and low-speed devices.

As an example, a computer as a host may supply power for use by a device that is connected to a port of the computer. As an example, a device may have its own power supply and be referred to as a self-powered device; whereas, a device that relies totally on power from a port (e.g., via a cable) may be referred to as a bus-powered device. As an example, a self-powered device may be configured to be powered via a port.

As an example, a port may include one or more indicators such as an LED or other light emitter. In such an example, states may be indicated via emission or emissions by an indicator or indicators. As an example, an off indicator may indicate a not operational state, an amber indicator may indicate an error condition state, a green indicator may indicate operational state, a blinking green indicator may indicate a software attention state (e.g., possible software error), a blinking amber indicator may indicate a hardware attention state (e.g., possible hardware error), and a combination of green and amber (e.g., blinking and/or non-blinking) may indicate one or more other states.

As an example, a computer may be configured to implement current limiting on one or more downstream facing ports. For example, where overcurrent condition may occur, a computer may cause a status and state change in one or more ports where such a change may be reported, for example, to take corrective action.

According to the USB 2.0 Specification, should the aggregate current drawn by a gang of downstream facing ports exceed a preset value, overcurrent protection circuit removes or reduces power from all affected downstream facing ports. As described in the USB 2.0 Specification, the preset value cannot exceed 5.0 A and must be sufficiently above the maximum allowable port current such that transient currents (e.g., during power up or dynamic attach or reconfiguration) do not trip the overcurrent protector. If an overcurrent condition occurs on any port, according to the USB 2.0 Specification, subsequent operation is not guaranteed, and once the condition is removed, it may be necessary to reinitialize the bus as would be done upon power-up. The USB 2.0 Specification describes polymeric positive temperature coefficient (PTC) and solid-state switches as examples that can be used for overcurrent limiting.

While various aspects of power are described with respect to the USB 2.0 Specification, such aspects may exist, for example, with respect to one or more other arrangements (e.g., USB 3.0 Specification, etc.). As to some examples of power-related values associated with USB Specifications, consider USB 1.0 port ratings of about 150 mA, about 5 V and about 0.75 W; consider USB 2.0 port ratings of about 500 mA, about 5 V and about 2.5 W; and consider USB 3.0 port ratings of about 900 mA, about 5 V and about 4.5 W.

As an example, a hub may be designed to report overcurrent as either a port or a hub event where a hub descriptor field wHubCharacteristics is used to indicate the reporting capabilities of a particular hub (see, e.g., USB 2.0 Specification at Section 11.23.2). In such an example, an overcurrent status bit in a hub or port status field can indicate the state of the overcurrent detection when the status is returned. As an example, an overcurrent status change bit in a hub or port change field may indicate if the overcurrent status has changed. According to the USB 2.0 Specification, an amber light may be illuminated where an overcurrent error exists.

As described in the USB 2.0 Specification, when a hub experiences an overcurrent condition, it must place all affected ports in the powered-off state and, where a hub has per-port power switching and per-port current limiting, an overcurrent on one port may still cause the power on another port to fall below a specified minimum. In this case, according to the USB 2.0 Specification, the affected port is placed in the powered-off state and C_PORT_OVER_CURRENT is set for the port, but PORT_OVER_CURRENT is not set. If the hub has over-current detection on a hub basis, then an overcurrent condition on the hub will cause all ports to enter the powered-off state. However, in this case, neither C_PORT_OVER_CURRENT nor PORT_OVER_CURRENT is set for the affected ports.

According to the USB 2.0 Specification, host recovery actions for an overcurrent event should include the following:

1. Host gets change notification from hub with over-current event.
2. Host extracts appropriate hub or port change information (depending on the information in the change bitmap).
3. Host waits for over-current status bit to be cleared to 0.
4. Host cycles power on to all of the necessary ports (e.g., issues a SetPortFeature(PORT_POWER) request for each port).
5. Host re-enumerates all affected ports.

In the USB 2.0 Specification, the term "host" is defined as the host computer system where the USB Host Controller is installed, which includes the host hardware platform (CPU, bus, etc.) and the operating system in use. As described herein, such an approach may be referred to as an "in-band" approach. In particular, such an approach relies on the CPU and operating system in use.

As to the USB 3.0 Specification, consider the example arrangement 123 that includes nine contacts: VBUS, D−, D+, and GND pins (e.g., as in the USB 2.0 Specification) and additional contacts for two differential pairs (SSRX+/− and SSTX+/−) and a ground (GND_DRAIN). In such an example, the two additional differential pairs of contacts can provide for SuperSpeed data transfer (e.g., dual simplex SuperSpeed (SS) signaling) and the GND_DRAIN contact can serve as a drain wire termination and, for example, for control of electromagnetic interference (EMI) and signal integrity.

According to the USB 3.0 Specification, a SuperSpeed transaction may be initiated by a host making a request followed by a response from a device where the device may accept the request or rejects it. If accepted then the device may send data or accept data from the host. If an endpoint is halted, a device may respond with a STALL handshake. If there is lack of buffer space or data, a device may respond with a Not Ready (NRDY) signal to tell the host that it is not able to process the request. As an example, when a device is ready, it may send an Endpoint Ready (ERDY) to a host (e.g., to reschedule a transaction). As an example, unicasting and limited multicasting of packets, combined with asynchronous notifications, can enable links that are not actively passing packets to be placed into one or more reduced power states (e.g., to facilitate power management).

As to encoding of data, a SuperSpeed bus can provide for a transfer mode at a nominal rate of about 5.0 Gbit/s (e.g., in addition to other transfer modes). With encoding overhead, raw data throughput may be about 4 Gbit/s. Data may be sent as a stream of eight bits (e.g., one byte segments) that may be scrambled and converted to a 10-bit format (e.g., to help reduce EMI) where an inverse process may be carried out at a receiving end. Scrambling may be implemented using, for example, a free running linear feedback shift register (LFSR). As an example, equipment according to the USB 3.0 Specification may support copper cabling that includes AWG 26 wires, for example, with a maximum length of about 3 meters (e.g., about 10 feet).

As an example, a system may include a power supply unit; a processor; memory operatively coupled to the processor; a chipset operatively coupled to the processor; diagnostic information memory; and a microcontroller operatively coupled to the chipset via a first diagnostic data transfer bus and the microcontroller operatively coupled to the power supply unit and to the diagnostic information memory via a second diagnostic data transfer bus. For example, the computer 110 is shown as including the PSU 113 and the processor 112 operatively coupled to the memory 114. In such an example, the circuit board 111 may include a chipset and a microcontroller. Further, the computer 110 may include diagnostic data transfer busses and diagnostic information memory. As an example, a system may be configured to transfer information such as diagnostic information in an "out-of-band" manner, optionally where one or more issues exist with an "in-band" operational environment (e.g., consider an OS environment implemented by the processor 112 of the computer 110).

As an example, a system may be configured for implementation of an "out-of-band" approach for one or more of port monitoring, data transfer, control, management, etc. For example, a system can include a processor; memory operatively coupled to the processor; a chipset operatively coupled to the processor; ports where each of the ports includes a respective power supply line; a hub operatively coupled to the ports and to the chipset for data transfer via an in-band protocol; and a microcontroller operatively coupled to the chipset and to the hub for data transfer via an out-of-band protocol and for control of power to the power supply lines.

Figure 2:
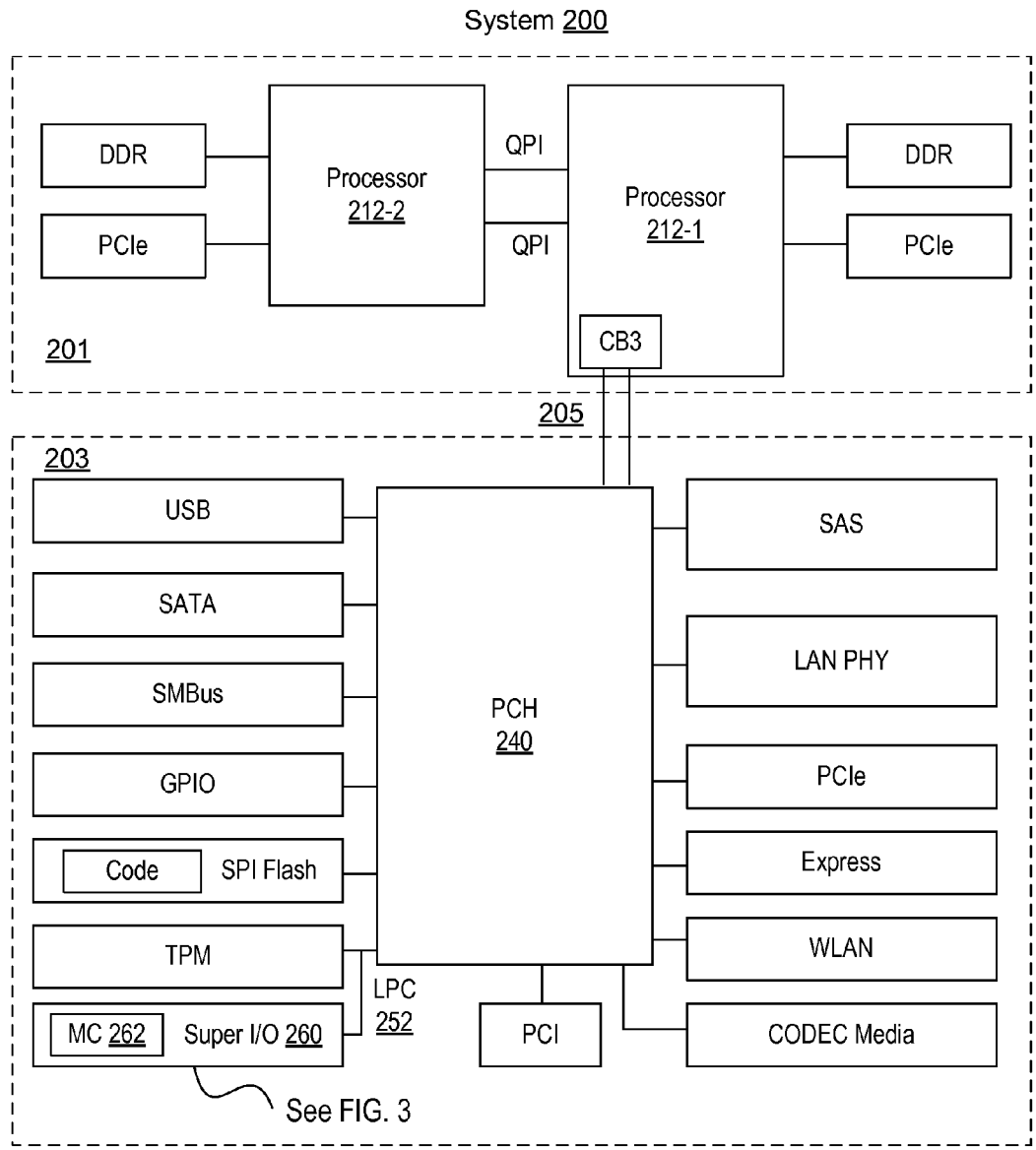
FIG. 2 is a diagram of an example of a system.
Figure 2:
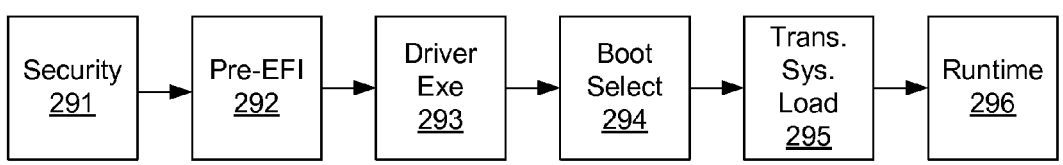

FIG. 2 shows an example of a system 200 that includes host system components that define, for example, a host hardware platform, along with an example of a method 290. As shown, the system 200 includes a processing portion 201 and an input/output portion 203 that is operatively coupled to the processing portion 201 via one or more electrical connections 205 (see also, e.g., optional INTEL® "Crystal Beach 3" (CB3) I/O acceleration technology, Intel Corporation, Santa Clara, Calif.). The processing portion 201 can include one or more processors 212-1 and 212-2 that may be operatively coupled to one or more memory busses (e.g., DDR, etc.) and optionally one or more other busses (e.g., PCI-E busses, etc.). In the example of FIG. 2, the input/output portion 203 includes a platform controller host (PCH) 240 that is operatively coupled to a Super I/O 260 via a bus 252, which may be, for example, a low pin count (LPC) bus.

In the example of FIG. 2, the Super I/O 260 can include a microcontroller (MC) 262. In such an example, the Super I/O 260 may be referred to as an embedded Super I/O (e.g., an "eSIO") as it includes the MC 262 as an embedded microcontroller.

As an example, the PCH may be referred to as a chipset. As an example, a chipset may be an INTEL® chipset. As an example, consider one of the INTEL® C600 series chipset (e.g., the C610, etc.). As an example, the INTEL® C610 chipset can include up to 10 ports SATA 6 Gb/s; up to 6 ports of USB 3.0 and 8 ports of USB 2.0; up to 8 PCI-E 2.0; x1, x2 and x4 supported; 6xSMBus, etc. The INTEL® C610 chipset may include firmware (e.g., INTEL® SPS 3.0 firmware, etc.). The INTEL® C610 may include USB 3.0 eXtensible Host Controller Interface (xHCI) capabilities according a computer interface specification that defines a register-level description of a host controller for USB (e.g., capable of interfacing with USB 1.x, 2.0, and 3.x compatible devices). Such capabilities may include xHCI Debug Capability Device Compliance capabilities, for example, for the WINDOWS® 8 OS.

As an example, the one or more processors 212-1 and 212-2 may include an INTEL® processor, an AMD® processor, etc. As an example, consider an INTEL® XEON® processor (e.g., E5-2600 vx series, etc.).

As to the Super I/O 260, it may be an eSIO. As an example, consider a NUVOTON® eSIO (e.g., NCT6683D-

LU eSIO, etc.). As an example, the MC 262 may be an 8-bit microcontroller that can include built-in RAM. As an example, the MC 262 may be a 1T 8-bit microcontroller. As an example, the MC 262 may be an X-bit microcontroller where X is at least 8. As an example, the MC 262 may include a 1T or higher "T" architecture (e.g., as to clock per instruction cycle).

As an example, the MC 262 may be configured to establish a firmware operating environment, for example, via execution of firmware (e.g., code). As an example, firmware may be stored in an external SPI flash accessible to the microcontroller. As an example, firmware may be optionally updated via an interface (e.g., via a LPC interface, a PS/2 interface, etc.). As an example, a microcontroller of a Super I/O may operate using a LINUX® kernel driver. As an example, a microcontroller may be a RISC-based microcontroller. As an example, a microcontroller may be an ARM-based microcontroller (e.g., generation of Advanced RISC Machine). As an example, a microcontroller may be an ARC-based microcontroller (e.g., generation of Argonaut RISC Core).

As an example, a microcontroller may include an I2C interface (e.g., an inter integrated circuit interface). As an example, such an interface may include data line circuitry and clock line circuitry. For example, such an interface may include a connection for one wire that operates as a serial data line (SDL) and a connection for one wire that operates as a serial clock line (SCL). As an example, two such wires (e.g., as a bus) may provide for transfers of data between a two I2C interfaces. For example, a microcontroller may include an I2C interface and another component may include an I2C interface. As an example, data transfers may be uni-directional (see, e.g., description of ultra fast mode of I2C below). As an example, interfaces may be configured for bi-directional data transfers (e.g., where a microcontroller includes clock in/out circuitry and data in/out circuitry and where another device includes clock in/out circuitry and data in/out circuitry). In such an example, data transfers may be bi-directional.

As an example, a two-wire bus (e.g., two-line bus) may be supplied with a supply voltage. In such an example, pulling a line to ground may be considered a logical zero while letting a line float may be a logical one (e.g., for binary operations). As an example, after 8 data bits in one direction, an "acknowledge" bit may be transmitted in the other direction (e.g., consider a single 0 bit (ACK)). In such an example, where the transmitter receives a "not acknowledge" bit (e.g., consider a single 1 bit (NACK)), this may mean, if a master node is transmitting to a slave node, the slave node is unable to accept the data (e.g., no such slave, command not understood, unable to accept any more data, etc.) and, if a slave node is transmitting to a master node, the master node desires that the transfer stops after this data (e.g., data byte).

As an example, a bus may be operatively coupled to a master node that generates a clock and that initiates communication with one or more slave nodes, which may be, for example, a node that receives the clock and that can respond when addressed by the master. As an example, such a bus may be an I2C bus. As an example, a SMBus may be defined as a subset of an I2C type of bus where, for example, the SMBus may define protocols more strictly that a basic I2C bus. As an example, a bus may support I2C transfers and SMBus transfers. As an example, a microcontroller may include two pins that may function as an I2C interface, a SMBus interface and/or other type of interface that may be implemented using two wires (e.g., a two-line interface).

As an example, a bus and interfaces according to an I2C specification may be configured for serial, 8-bit oriented, bidirectional data transfers in a standard mode (e.g., up to 100 kbit/s), in a fast mode (e.g., up to 400 kbit/s), in a fast mode plus (e.g., up to 1 Mbit/s), in a high speed mode (e.g., up to 3.4 Mbit/s), etc. As an example, a bus and interfaces according to an I2C specification may be configured for serial, 8-bit oriented uni-directional data transfers in, for example, an ultra fast mode (e.g., up to 5 Mbit/s or more).

As to an ultra fast mode (e.g., UFm), an interface may include a two-wire push-pull driver with UFm serial clock (USCL) and UFm serial data (USDA) capabilities. A slave node (e.g., a slave component or device) may include a unique address and operate as a receiver that receives information from a master node (e.g., a master component or device). As an example, consider the following terminology for uni-directional operations: a transmitter is a component or device that sends data to a bus; a receiver is a component or device that receives data from the bus; a master node is a component or device that initiates a transfer, generates clock signals and terminates a transfer; and a slave node is a component or device addressed by a master node.

As an example, in UFm, USDA and USCL are unidirectional lines, with push-pull outputs. When a bus is free, both lines may be pulled to "high", for example, by an upper transistor of an output stage. As an example, the number of interfaces connected to a bus that implements UFm may be limited, for example, by one or more of bus loading, reflections from cable ends, connectors, stubs, etc. As an example, levels of the logical 0 (low) and 1 (high) may not be fixed as they may depend on an associated level of voltage (e.g., consider a driver voltage $V_{DD}$). As to data transfers via UFm, bytes put on an USDA line are to be eight bits long where ACK and NACK are not logically necessary; noting that they may be referred to as the ninth clock cycle. For example, a master node does not acknowledge in UFm because it does not receive data via its bus but may still generate a 1 as a ninth bit for a slave node to conform to the I2C-bus protocol. As an example, 7-bit or 10-bit addressing may be implemented.

As an example, a system may include one or more busses that operate according to a power management bus (PMBus) standard (e.g., to communicate with a power converter). As an example, a system may include one or more busses that operate according to an intelligent platform management interface (IPMI).

As an example, an SIO (e.g., or eSIO) may include a Platform Environment Control Interface (PECI), an SB-TSI interface (temperature sensor interface), a SMBus master, Deep Sleep Well (DSW) glue logic, a power supervisor, a USB host, a Real Time Clock (RTC), and a real time Port 80 display (e.g., via UART).

As an example, an eSIO may include features to support temperature and voltage sensors, fan rotation sensors and fan control engines. As an example, temperatures may be measured with a resolution of about 0.5 degrees C. As an example, voltages may be measured with a resolution of millivolts. As an example, fan speed may be reported in RPM. As an example, setting for an eSIO may be set via BIOS or other mechanism.

As an example, an eSIO may include features to reduce a system's power consumption while the system is, for example, in a low power management (PM) state (e.g., S5, etc.). As an example, an eSIO may include features to support an LPC interface, a Printer Port, UARTs, KBC and general purpose I/O (GIPO).

As to the method 290, it can include a security block 291, a pre-EFI environment block 292, a driver execution block 293, a boot selection block 294, a transfer to host system load block 295 and a runtime block 296. As an example, the method 290 may include loading and executing Unified Extensible Firmware Interface (UEFI) code, which may be stored, for example, in flash memory (see, e.g., the code in the SPI flash operatively coupled to the PCH 240). As an example, where BIOS is mentioned, it may be considered to include UEFI (e.g., UEFI code, environment, etc.; where an UEFI may be a replacement to a BIOS interface). As an example, an OS loaded via UEFI may be an UEFI-aware OS. As an example, a computer may include one or more UEFI firmwares, optionally including one or more OEM-related UEFI firmwares.

As an example, in the method 290, the security block 291 may implement a security (SEC) phase that may verifies software present in a firmware volume, CPU, chipset, and motherboard initialization code. The pre-EFI block 292 may initiate a phase that can initialize a CPU, temporary RAM and a boot firmware volume (BFV). Such a process may start dispatching PEIMs (pre-EFI Initialization modules) that may be in the BFV, for example, with an aim to initialize found hardware in a system (e.g., basic platform dependent initialization code). As an example, the pre-EFI block 292 may include building a hand-off block list with found resources/interfaces that, for example, may serve as an abstraction to physical peripherals, platform dependent code, etc. Such a list may include descriptors ready to be passed to a driver execution phase per the driver execution block 293.

As an example, a driver execution environment (DXE) phase may consume a hand-off block list (HOBL) to initialize system physical memory, I/O and MMIO resources, and to dispatch DXE drivers found in system firmware volumes (e.g., as may be described within the HOBL). As an example, a DXE core may be abstracted from platform hardware through a set of DXE architectural protocols. A DXE core may consume these protocols to produce, for example, EFI boot services and EFI runtime services. As an example, DXE drivers loaded from firmware volumes may produce DXE architectural protocols, and initialize a system (e.g., host system). A DXE core have services to load and start DXE drivers before a DXE driver is executed In the method 290, the boot selection block 294 may commence a boot device selection (BDS) phase. Such a phase may load UEFI drivers and one or more UEFI applications, for example, as found in a boot device. Such a phase may present a boot manager (e.g., for user input) and boot a host system. A UEFI boot sequence may include a platform firmware read of a boot order list from a globally defined NVRAM variable. Other NVRAM boot variables may include information as to what is to be booted, for example, were a variable includes a pointer to a hardware device and optionally to a file on that hardware device that includes an UEFI image to be loaded.

In the method 290, the transfer system load block 295 may include a function such as an ExitBootService EFI function, for example, to signal that an OS is able to use its own functions in an established OS runtime environment per the runtime block 296 (e.g., a host system OS runtime environment).

As an example, UEFI may complement an Advanced Configuration and Power Interface (ACPI), which may be implemented in a runtime environment (e.g., operating system-directed power management (OSPM)). A platform compliant with the ACPI specification can provide an OSPM with direct and exclusive control over the power management and motherboard device configuration functions of a computer. During OS initialization, OSPM takes over various functions from a pre-OS environment.

As an example, a system may be configured with a microcontroller that can perform one or more power-related tasks. In such an example, an OSPM may operate in an in-band mode while a microcontroller may perform power-related tasks in an out-of-band mode (e.g., optionally without reliance on an OS runtime environment that may provide an OSPM environment). For example, some tasks may be duplicated, some tasks may be differentiated, etc. As an example, where an OS runtime environment experiences an issue (e.g., hangs, etc.), a microcontroller mediated power management environment may be capable of performing tasks, optionally tasks that may act to rectify an OS runtime environment issue.

According to the ACPI specification, a so-called embedded controller may be implemented for in-band operations with an OSPM in a notebook architecture (e.g., clamshell computer) where a chipset contains the interrupt logic, performs the power button function (which is part of the fixed register space), the lid switch function (in portables to indicate when the clam shell lid is open or closed), and the RI# function (which can be used to wake a sleeping system); and where the embedded controller chip is used to perform the AC power detect and dock/undock event logic. The ACPI specification describes System Control Interrupts (SCIs) and System Management Interrupts (SMIs) where a SCI is an active, low, shareable, level interrupt used by hardware to notify the OS of ACPI events and where a SMI is an OS-transparent interrupt generated by interrupt events on legacy systems. Per the ACPI specification, on ACPI systems, interrupt events generate an OS-visible interrupt that is shareable. An embedded controller for ACPI can support some OEM-specific functions that use an OS-transparent interrupt in the embedded controller, represented by the EXTSMI# signal.

Per the ACPI specification, the most common host interface architecture incorporated into microcontrollers is modeled after the standard IA-PC architecture keyboard controller that an ACPI-compatible OS can use to communicate with embedded controller-based SMBus host controllers (EC-SMB-HC). Per the ACPI specification, this interface allows the host processor (under control of OSPM) to manage devices on the SMBus. Typical devices residing on the SMBus include Smart Batteries, Smart Battery Chargers, contrast/backlight control, and temperature sensors. Per the ACPI specification, the embedded controller performs complex low-level functions through a simple interface to the host microprocessor(s).

Figure 3:
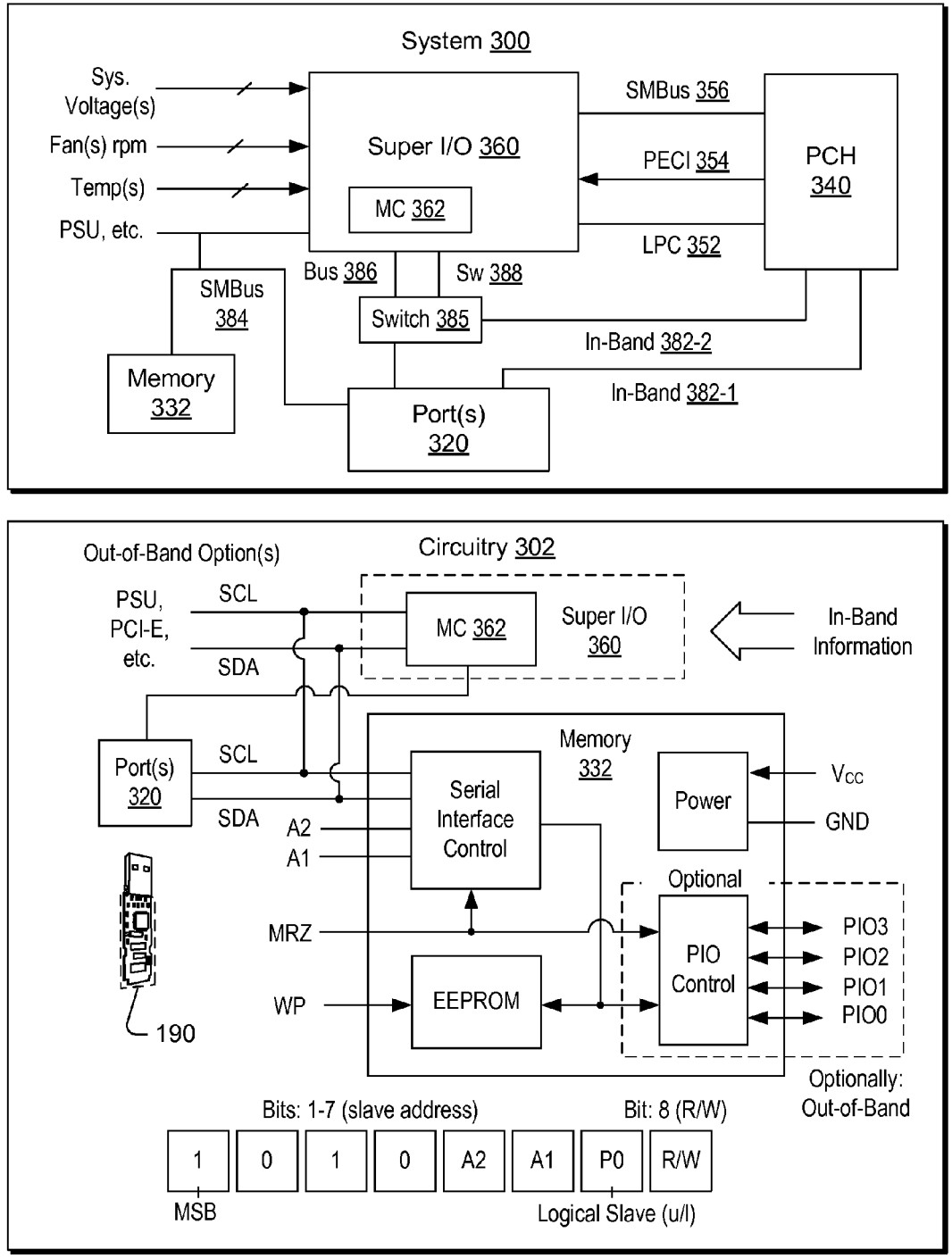
FIG. 3 is a diagram of an example of a system that includes a microcontroller, which may be embedded in a Super I/O and an example of circuitry that may implement one or more out-of-band operations.

FIG. 3 shows an example of a system 300 that may be optionally implemented as part of the system 200 of FIG. 2, as part of the computer 110 of FIG. 1, etc. FIG. 3 also shows an example of circuitry 302 that may be operated in an out-of-band manner, optionally based in part on in-band information.

As shown, system 300 includes one or more ports 320, memory 332, a PCH 340, a Super I/O 360 and a microcontroller 362, which may be an embedded microcontroller where the Super I/O 360 may be referred to as an embedded Super I/O (eSIO).

In the example of FIG. 3, a LPC bus 352 operatively couples the PCH 340 and the Super I/O 360, a PECI bus 354 operatively couples the PCH 340 and the Super I/O 360, and a SMBus 356 operatively couples the PCH 340 and the Super I/O 360. As shown, an in-band bus 382-1 and an in-band bus 382-2 can operatively couple the PCH 340 and the one or more ports 320. As an example, a SMBus 384 may operatively couple one or more power-related components and the Super I/O 360. As an example, the SMBus 384 may operatively couple the memory 332 and the Super I/O 360. As an example, the SMBus 384 may operatively couple the one or more ports 320 (e.g., and/or a hub thereof, a switch thereof, etc.) and the Super I/O 360.

As shown in the example of FIG. 3, the Super I/O 360 is operatively coupled to a switch 385, which may operatively couple an information bus 386 to one or more of the ports 320. For example, the bus 386 and the in-band bus 382-2 may share one of the one or more ports 320, as determined by a state of the switch 385. In such an example, a switch control line (Sw) 388 may allow for switching the switch 385 to one or more states such as a data transfer state for the bus 386 (e.g., an out-of-band data transfer state) or a data transfer state for the in-band bus 382-2 (e.g., an in-band data transfer state). As an example, the switch control line (Sw) 388 may be controlled via one or more instructions executable via the microcontroller 362.

In the example of FIG. 3, the system 300 may be configured to allow the SIO 360, as an eSIO, to collect, process, and display system-level diagnostic information using communications out-of-band (e.g., via one or more protocols). Such out-of-band communications may optionally be performed where one or more issues exist pertaining to a host system where in-band communication may be problematic or unavailable.

As an example, an eSIO may include one or more uni-directional and/or one or more bi-directional communication channels. For example, such an eSIO may include a BIOS communication channel to the sSIO (e.g., via LPC). In such an example, communication between BIOS and the eSIO may exist for I/O control, fan control parameters, etc. and additionally for BIOS passing key diagnostic information, such as, for example, hang conditions and/or failure to successfully execute a particular routine. In such an example, BIOS may pass housekeeping information to the eSIO, such as, for example, system VPD (model, serial number), real-time clock data to be used for diagnostic time-stamping, and the ability for an end user to enable/disable the diagnostics.

As an example, an eSIO may include an I2C communication channel to/from the eSIO. While such a channel may be used to collect data from thermal sensors, it may also be used as a communication bus to monitor and collect data from one or more power-related components (e.g., power supply unit related components, etc.) and, for example, one or more PCI-E components or devices in a computer. Such a communication channel may also allow for monitoring for various faults or status changes on a system. As shown in the example of FIG. 3, the SMBus 384, which may be considered an I2C communication channel, may be used to communicate with an external flash chip to enable logging of all diagnostic events.

As an example, the memory 332 may be an external flash chip. As an example, the memory 332 may be serial EEPROM. Referring to the example circuitry 302, FIG. 3 shows an example of the memory 332 as including serial interface control circuitry, power circuitry, EEPROM and optionally programmable input output control circuitry (e.g., PIO). As an example, the memory 332 may be operatively coupled to the SMBus 384 and addressable via the SMBus 384. The memory 332 may be a slave to a master controlled via the microcontroller 362, for example, such that the microcontroller 362 can direct data to the memory 332 for storage. The microcontroller 362 may be configured to address the memory 332 to read data and/or to direct data to one or more destinations, which may be one or more components operatively coupled to the SMBus 384. For example, consider routing data from the memory 332 to the Super I/O 360 and/or to one or more of the ports 320, optionally via a port hub or in a manner that bypasses a port hub. As shown, the device 190 may be operatively coupled to one of the one or more ports 320 for transfer of information (e.g., to the device 190 and/or from the device 190).

FIG. 3 also shows an example of a series of bits that may be transmitted to the memory 332. In such an example, the PO bit may be transmitted in place of the A0 address bit to specify whether the "lower half" (0b) or the "upper half" (1b) of the memory 332 is addressed, for example, where the memory 332 occupies two logical slave addresses, one for each half of the memory. In such an example, the lower half of the memory may be referenced as address A0*h* and the upper half as address A2*h* where addresses A0*h* and A2*h* are correct if the A1 and A2 pins are tied to logic 0. For different conditions at these pins the slave address may change accordingly. As shown, the last bit of the slave-address/direction byte (R/W) may define data direction. For example, the microcontroller 362 may transmit a last bit that causes the memory 332 to write data and a different last bit that causes the memory 332 to read data.

As an example, a data transfers may be initiated by the microcontroller 362, as a master or master node, when the SMbus 384 is not busy. In such an example, the master may generate the serial clock (SCL), control the bus access, generate the START and STOP conditions, and determine the number of bytes transferred on the data line (SDA) between START and STOP. In the example of FIG. 3, data is transferred in bytes with the most significant bit being transmitted first. After each byte, an acknowledge bit may follow to allow synchronization between master and slave.

From a master's point of view, the memory 332 may behave like a memory device with an address range of bytes (e.g., consider 512 bytes). In the example of FIG. 3, the memory 332 may include one or more types of memory (e.g., SRAM, EEPROM and read-only areas). In such an example, write behavior can depend on the memory type and the characteristics of the location that is addressed. For example, SRAM registers may be written from 1 byte to multiple bytes at a time and EEPROM may be written from 1 byte to 16 or 8 bytes at a time, depending on the memory location. As an example, the memory 332 may include circuitry operable in an I2C mode and/or a SMBus mode.

As an example, an eSIO may include a 7-segment display output channel. As an example, a channel to output Port 80 may provide for information such as checkpoint codes during boot and may further provide for display diagnostic error codes (e.g., for a user, etc.). As an example, the microcontroller 362 may process information and generate one or more codes based at least in part on such information. Where a computer includes a 7-segment display or displays, the microcontroller 362 may output information to cause the display or displays to show a code or other information. As an example, the microcontroller 362 may direct one or more generated codes (e.g., suitable for display via a 7-segment display) to memory such as the memory 332 and/or to one of the one or more ports 320.

As an example, an eSIO may include a USB port communication path. For example, consider the bus 386 of the system 300. As an example, a USB host (e.g., 1.1, etc.) may be built into an eSIO to provide a communication path for output of diagnostic information (e.g., to an end-user, a technician, etc.). For example, during a failure condition, USB port communication may be implemented to communicate diagnostic warnings and errors to an endpoint device (see, e.g., the devices 190 of FIG. 1, etc.), for further processing/analysis. As shown in the example of FIG. 3, the one or more ports 320 include a communication path (e.g., the in-band bus 382-1 and/or the in-band bus 382-2) with the PCH 340 (e.g., the chipset). As an example, a switch may be included that is switchable by an instruction, a signal, etc. initiated by an eSIO that may switch one or more of the one or more ports 320 to diagnostic mode, for example, for communication of information from the eSIO to an endpoint component or device.

As an example, in the system 300 of FIG. 3, the LPC bus 352 may be operated for in-band communication (e.g., data transfers) from the SIO 360 to the PCH 340 and the SMBus 356 and/or the SMBus 384 may be operated for out-of-band communication (e.g., data transfers).

As an example, a system can include a Super I/O that includes a data transfer interface; a memory unit that includes memory and a data transfer interface; a bus that operatively couples the data transfer interface of the Super I/O to the data transfer interface of the memory unit; and a microcontroller embedded in the Super I/O that includes circuitry to receive data via the data transfer interface of the Super I/O, to analyze at least a portion of the data to generate a result, and to transfer the result to the memory unit via the bus. For example, a computer may include the Super I/O 360 with the microcontroller 362 as an embedded microcontroller and with a data transfer interface (e.g., an I2C interface, optionally configured as a SMBus interface or PMBus interface), the memory 332 as a memory unit that includes memory and a data transfer interface (e.g., an I2C interface, optionally configured as a SMBus interface or PMBus interface), the SMBus 384 as a bus that operatively couples the data transfer interface of the Super I/O 360 to the data transfer interface of the memory 332 and the microcontroller 362 embedded in the Super I/O 360 where the microcontroller includes circuitry to receive data via the data transfer interface of the Super I/O, to analyze at least a portion of the data to generate a result (e.g., a signal, an error code, etc.), and to transfer the result to the memory 332 via the SMBus 384. In such an example, the computer may include a port hub that includes a data transfer interface that is operatively coupled to the bus and a port switch that switches a connection state of a port operatively coupled to the port hub. In such an example, the microcontroller embedded in the Super I/O may include circuitry to transfer information to the port hub, circuitry to control the connection state of the port switch, and circuitry to transfer information from the Super I/O to the port in a manner that bypasses the port hub (see, e.g., the hub 530 of the system 500 of FIG. 5).

Figure 4:
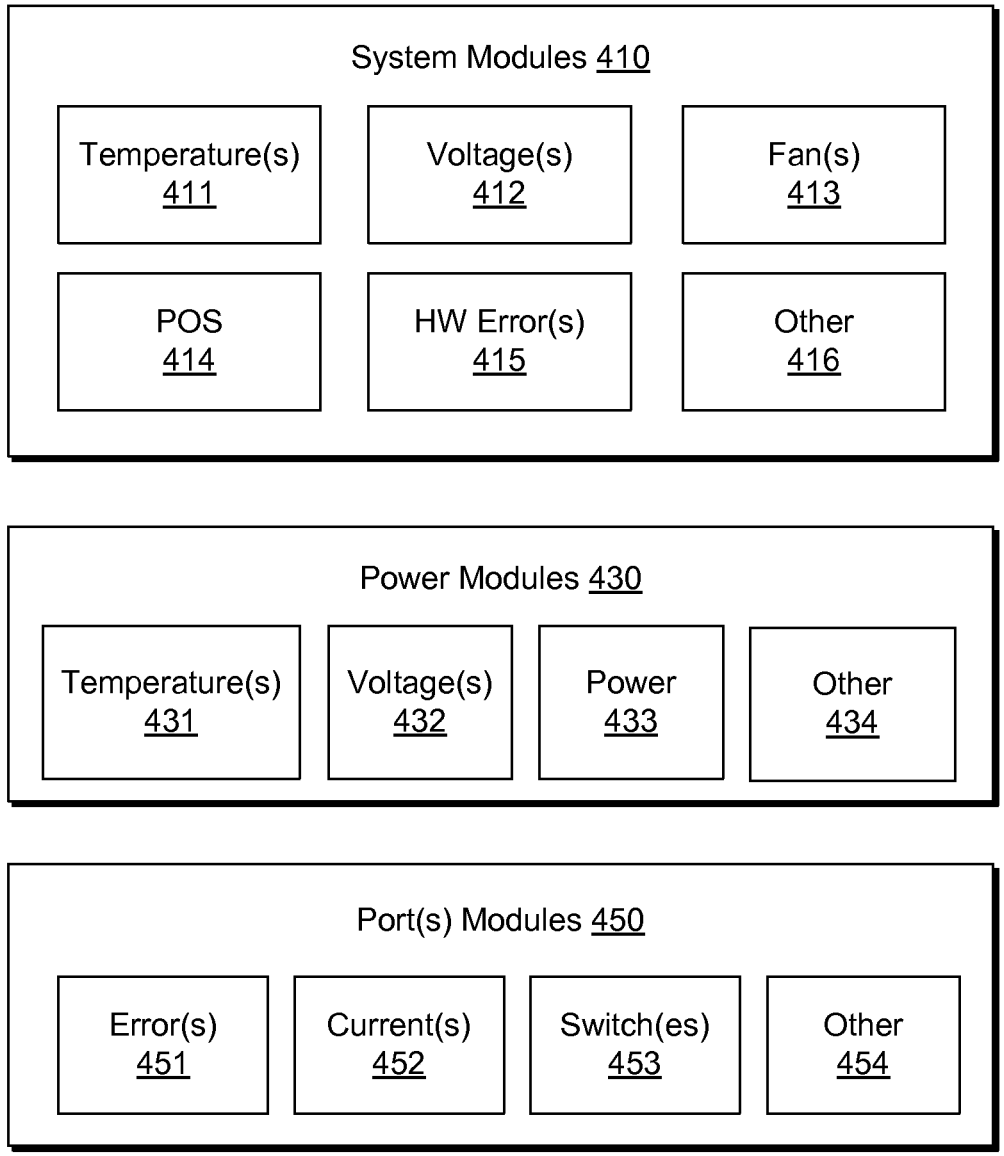
FIG. 4 is a diagram of examples of modules.

FIG. 4 shows various examples of system modules 410, power modules 430 and port modules 450. As an example, such modules may be implemented as one or more of circuitry, instructions, logic, etc. at least in part within an eSIO. For example, a microcontroller embedded in an SIO may be configured to execute instructions stored in memory accessible by the microcontroller where the instructions may operate on one or more inputs (e.g., input information) to generate one or more outputs (e.g., output information). As an example, an output may be a signal, a command, etc. As an example, output may be a signal that is communicated via a bus, which may be a uni-directional bus, a bi-directional bus or other type of bus (e.g., a high/low bus, etc.).

As shown in the example of FIG. 4, the system modules 410 may include a temperature module 411, a voltage module 412, a fan module 413, a POS module 414, a hardware error module 415 and optionally one or more other modules 416. As shown in the example of FIG. 4, the power modules 430 may include a temperature module 431, a voltage module 432, a power module 433 and optionally one or more other modules 434. As shown in the example of FIG. 4, the port modules 450 may include an error module 451, a current module 452, a switch module 453 and optionally one or more other modules 454.

As an example, an eSIO may be configured to monitor system over temperature, system over voltage, system under voltage, fan failure, power on sequence failure (POS failure), catastrophic hardware error, power supply unit (PSU) over voltage, PSU under voltage, PSU over power, PSU under power, PSU over temperature, hub port failure, port failure, hub overcurrent, port overcurrent, etc. For example, information may be received by a microcontroller, embedded in an SIO, via an I2C bus (e.g., SMBus, PMBus, etc.) and processed by the microcontroller to determine whether a condition exists that may be considered to be an "event". In such an example, the microcontroller may generate an error code that represents the event and transfer the error code (e.g., as data) to one or more of memory and a port, which may be operatively coupled to the microcontroller via the I2C bus (e.g., SMBus, PMBus, etc.). For example, consider the microcontroller 362 of FIG. 3 directing the error code to the memory 332 and/or one or more of the ports 320 in an out-of-band manner.

As an example, in the system 300, the PECI bus 354 may provide for monitoring processor(s) temperature(s), memory temperature(s), etc. As an example, in the system 300, the LPC bus 352 may provide for monitoring host system hangs, memory failures, boot failures, etc. As an example, the LPC bus 352 may provide for enabling one or more features, for disabling one or more features, etc., which may optionally be diagnostic features.

As an example, a microcontroller embedded in an SIO may include circuitry that can process information received from a PCH pertaining to in-band operations and information received from one or more components via an I2C bus (e.g., SMBus, PMBus, etc.). In such an example, the microcontroller may generate a code based at least in part on the information received and then transmit that code to one or more of a memory and a port in an out-of-band manner. As an example, information pertaining to in-band operations may indicate an error that has caused a host system environment to hang (e.g., consider an OS runtime environment hang). In such an example, a microcontroller embedded in an SIO may process the information and determine whether the error can be corrected, for example, under issuance of a control signal or signals by the microcontroller in an out-of-band manner. For example, the microcontroller may issue a signal that causes a reset of one or more components of a computer (e.g., a power component, a PCI-E linked component, etc.).

Figure 5:
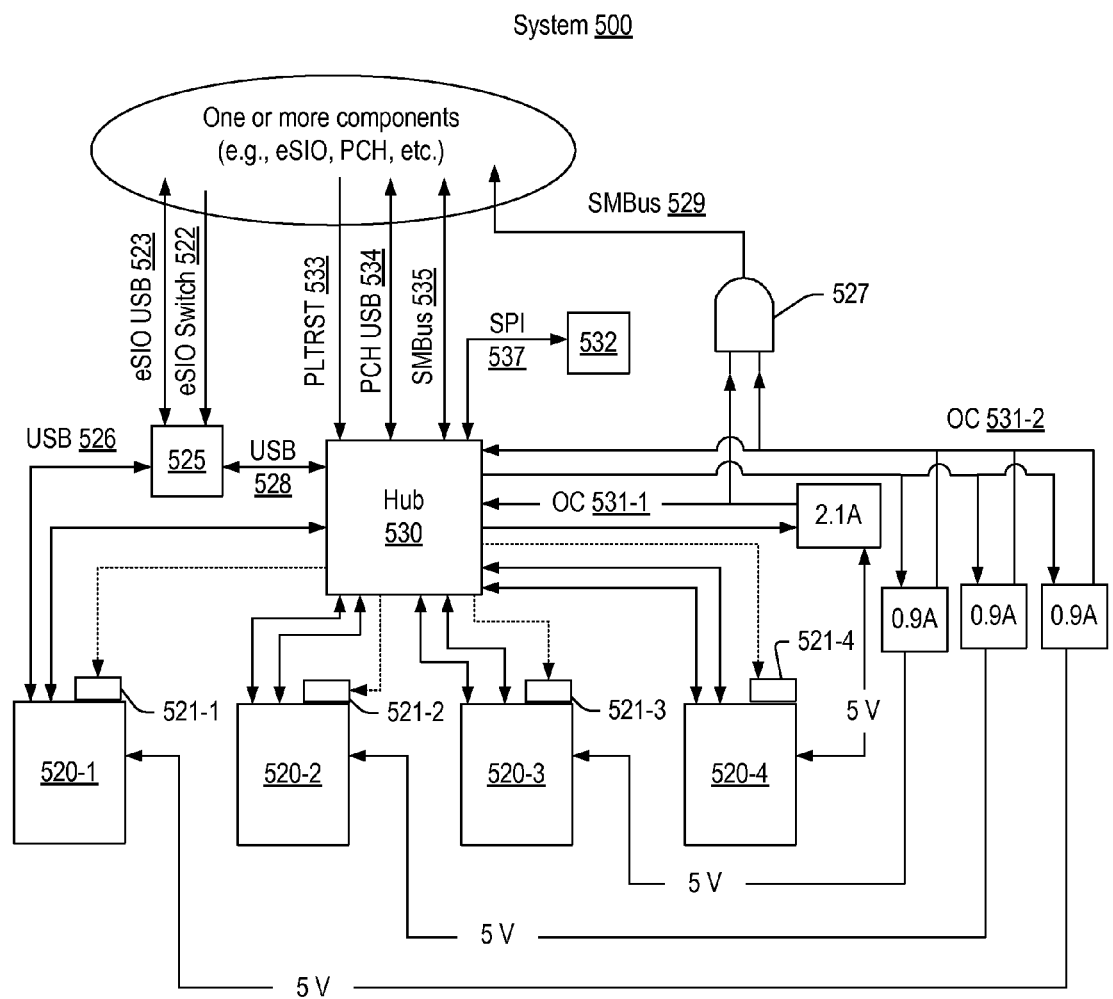
FIG. 5 is a diagram of an example of a system that includes a switch and a hub.

FIG. 5 shows an example of a system 500 that may be, for example, a hub and port system suitable for implementation as the one or more ports 320 of the system 300 of FIG. 3, as the one or more ports 120 of the computer 110, etc.

As shown, the system 500 includes ports 520-1, 520-2, 520-3 and 540-4, which may be, for example, USB ports. As shown, individual ports may include respective indicators 521-1, 521-2, 521-3 and 521-4, which may be, for example, LEDs or other components. As an example, the indicators 521-1, 521-2, 521-3 and 521-4 may be multi-state indicators (e.g., off/on, green, amber, blinking, etc.).

In the example of FIG. 5, the system 500 includes a switch 525, which may be a bus switch, for example, switchable via an eSIO signal bus 522 where the switch 525 is also operatively coupled to a USB bus 526 and to an eSIO USB bus 523 and to a hub 530, which is operatively coupled to the ports 520-1, 520-2, 520-3 and 540-4.

In the example of FIG. 5, the hub 530 includes overcurrent signal lines 531-1 and 531-2 where, for example, the overcurrent signal line 531-1 may be operatively coupled to a power supply line for the port 520-4, which may be a high power port with respect to one or more of the other ports 520-1, 520-2 and 520-3 (e.g., lower power ports). As an example, the port 520-4 may be supplied with power of about 5 V and about 2 A (e.g., about 2.1 A) while the ports 520-2, 520-3 and 540-4 may be supplied with power of about 5 V and about 1 A (e.g., about 0.9 A). As shown in the example of FIG. 5, a logic circuit 527 may be operatively coupled to the overcurrent signal lines 531-1 and 531-2 and to, for example, an SMBus 529 (e.g., an I2C bus).

As an example, the hub 530 may include battery charging controller logic that may, for example, enable Dedicated Charging Port (DCP) and Charging Downstream Port (CDP) functionality (e.g., per the USB Battery Charging 1.2 Specification), charging in sleep mode (e.g., while a host system is in a low power management state), etc. As an example, a CDP mode may allow for data transfer while charging.

In the example of FIG. 5, the hub 530 is also shown as being operatively coupled to memory 532, for example, via a serial peripheral interface (SPI) bus (e.g., a synchronous serial interface bus, which may include four wires). In such an example, the memory 532 or circuitry associated therewith may include an SPI interface and the hub 530 may include an SPI interface. As an example, the system 500 may be configured for unidirectional and/or bidirectional data transfers with respect to the hub 530 and the memory 532, which may be, for example, serial EEPROM.

As shown in the example of FIG. 5, the system 500 can include a platform reset bus 533 (e.g., signal line, etc.), a PCH USB bus 534 and a SMBus 535 that are operatively coupled to the hub 530. As an example, the busses 533, 534 and 535 may be operatively coupled to one or more of a PCH and an eSIO. For example, the SMBus 535 may be operatively coupled to an eSIO (e.g., an eSIO to which the eSIO switch bus 522 and the eSIO USB bus 523 are operatively coupled). As an example, the PCH USB bus 534 may be configured for in-band data transfers, for example, from a PCH such as the PCH 340 of the system 300 to one or more of the ports 320, which may be one or more ports such as the one or more ports 520-1, 520-2, 520-3 and 520-4 of the system 500 of FIG. 5. As an example, the in-band bus 382-1 and/or the in-band bus 382-2 of the system 300 of FIG. 3 may be the PCH USB bus 534 of the system 500 of FIG. 5.

In the example of FIG. 5, the hub 530 can include an integrated in-house USB PHY that enables an upstream port and downstream ports. For example, the PCH USB 534 may be considered an upstream bus of the hub 530 that is operatively coupled to an upstream port of the hub 530.

As shown in the example of FIG. 1, the computer 110 includes the one or more ports 120 as a series of front side ports of the computer 110. For example, the one or more ports 120 may be four ports such as the four ports 520-1, 520-2, 520-3 and 520-4 of the system 500 of FIG. 5. In such an example, the system 500 may reduce the amount of wiring involved when cabling a front USB solution from a motherboard of the computer 110. As an example, the system 500 may provide for implementation of methods for independently powering one or more of the ports 120 of the computer 110. As an example, the system 500 may provide for implementation of methods of controlling at least one of the ports 120 as an out-of-band USB port, for example, in the event in-band communication with the ports 120 fails. As an example, as part of out-of-band management, the system 500 can provide for implementation of a method of re-tasking a port for alternative usage. For example, the port 520-1 may be re-tasked via switching via the switch 525.

An approach that uses the system 500 may differ from an approach that relies on cabled USB ports that are wired from a motherboard of a computer on a port-by-port basis, which can be problematic in the sense that if cabling of many ports is required, the amount of cable routing becomes cumbersome to the system. Additionally, such an implementation can include connecting these ports back to a centralized USB controller or hub on a motherboard of a computer where, if either the host system or controller/hub fails or becomes inoperative, so too do the USB ports, as there is no additional way to manage them.

The system 500 may be an assembly that includes multiple USB ports and a USB hub, which can help reduce the amount of cabling from a motherboard of a computer to the USB ports. In the system 500, the various busses can control the USB hub and the associated USB ports.

As an example, host system USB traffic and USB device management may occur through an in-band USB protocol; however, in the event the host system encounters an abnormal condition, the system 500 may implement a method for handling such an issue via an out-of-band management protocol. For example, a microcontroller embedded in a Super I/O may control a hub via an I2C bus (e.g., SMBus). Such a microcontroller may be operate as a USB hub and port manager for various operational conditions, including, for example, data transfers for usage, data transfers for diagnostics, power management, etc. In such an arrangement, the microcontroller may receive information and make decisions based at least in part on such information (e.g., in conjunction with logic, rules, etc.) to manage USB hub and port operations, for example, in an out-of-band manner optionally without intervention from a host system (e.g., in-band intervention). Out-of-band management can allow various actions to be taken with respect to one or more USB ports, for example, based on one or more abnormal conditions that may be experienced (e.g., signaled, reported, sensed, etc.).

As an example, a system may be configured to instruct USB circuitry to enable/disable one or more USB ports which may have malfunctioned; to instruct USB circuitry to apply power to USB ports on a port-by-port basis; to detect an overcurrent condition on one or more USB ports and ti transfer a signal as feedback to an embedded microcontroller of a Super I/O (e.g., eSIO); to attempt to reset, or clear, an overcurrent condition in an out-of-band manner via an embedded microcontroller of a Super I/O (e.g., eSIO) and where, for example, such overcurrent condition cannot be cleared, to lock-out one or more "defective" USB ports and, for example, to inform a host system of the USB port status; where, if the USB hub enters a hung or non-operational state, to reset the USB hub in an out-of-band manner (e.g., without affecting a host system's operation); and, where a host system becomes inoperative, such that USB traffic from the host controller can no longer occur, via an embedded microcontroller in a Super I/O, operations may be performed to gain control of one of the USB ports and to direct USB communication(s) to a USB host other than a USB host of the host system.

As an example, a USB host that is other than that of a USB host of a host system may be a USB host associated with a Super I/O and manageable by an embedded microcontroller of the Super I/O (e.g., an embedded Super I/O). In such an example, out-of-band information may be passed to a USB device on a particular USB port (e.g., in a manner independent of operation of a host system). As an example, information that may be passed (e.g., data transferred) may pertain to one or more events, conditions, etc. that may have caused the host system of a computer to stop operating).

As an example, a system can include a processor; memory operatively coupled to the processor; a chipset operatively coupled to the processor; ports where each of the ports includes a respective power supply line; a switch; a hub operatively coupled to the ports and to the chipset for data transfer via an in-band protocol; and a microcontroller operatively coupled to the chipset, to the switch and to the hub where the microcontroller includes circuitry that controls the switch to transfer data to one of the ports via an out-of-band protocol and where the microcontroller includes circuitry that controls supply of power to the power supply lines.

As an example, an assembly can include a hub; USB ports operatively coupled to the hub; and a switch operatively coupled to the hub and one of the USB ports where the switch includes an out-of-band state for microcontroller-based USB host-mediated data transfer via an out-of-band protocol and an in-band state for chipset-based USB host-mediated data transfer via an in-band protocol. For example, various components of the system 500 of FIG. 5 may be an assembly.

Figure 6:
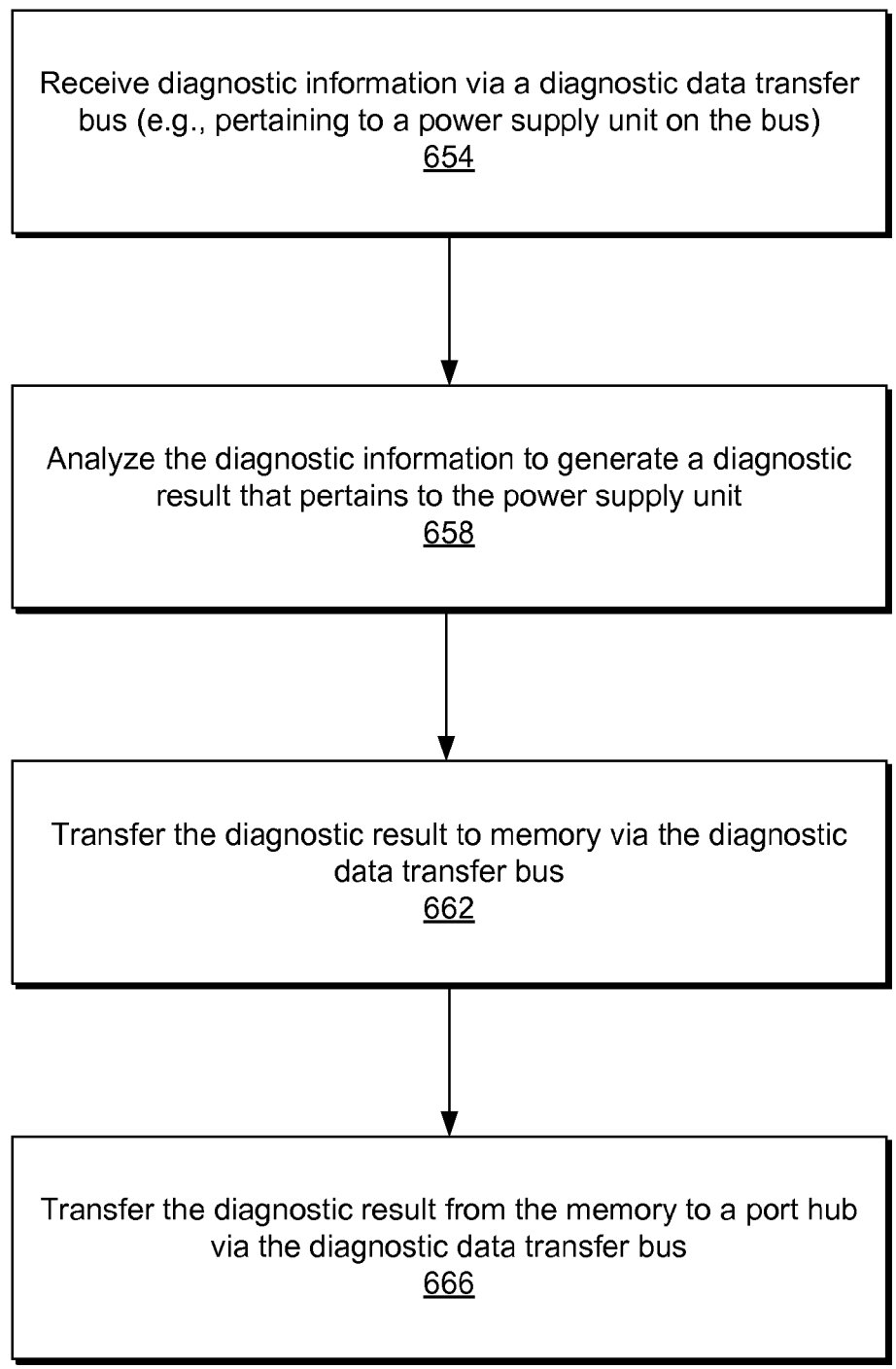
FIG. 6 is a diagram of an example of a method.

FIG. 6 shows an example of a method 650 that includes a reception block 654 for receiving diagnostic information via a diagnostic data transfer bus where the diagnostic information pertains to a power supply unit operatively coupled to the diagnostic data transfer bus; an analysis block 658 for analyzing the diagnostic information to generate a diagnostic result that pertains to the power supply unit; a transfer block 662 for transferring the diagnostic result to memory via the diagnostic data transfer bus; and a transfer block 666 for transferring the diagnostic result from the memory to a port hub via the diagnostic data transfer bus. In such an example, the method may include analyzing the diagnostic information via execution of instructions on a microcontroller embedded in a Super I/O. As an example, a method may be optionally performed in an out-of-band manner (e.g., without execution of instructions in an OS runtime environment of a host system). As an example, a method may include transferring a diagnostic result to memory at least in part by implementing a SMBus protocol.

As an example, a method can include switching a switch associated with a port associated with a port hub and transferring a diagnostic result to the port in a manner that bypasses the port hub. In such an example, switching may include issuing a switch signal from a microcontroller embedded in a Super I/O to the switch.

As an example, a method may include receiving from a chipset diagnostic information that pertains to a processor operatively coupled to the chipset and, for example, analyzing the diagnostic information that pertains to the processor to generate a diagnostic result and transferring the diagnostic result to memory via a diagnostic data transfer bus.

Figure 7:
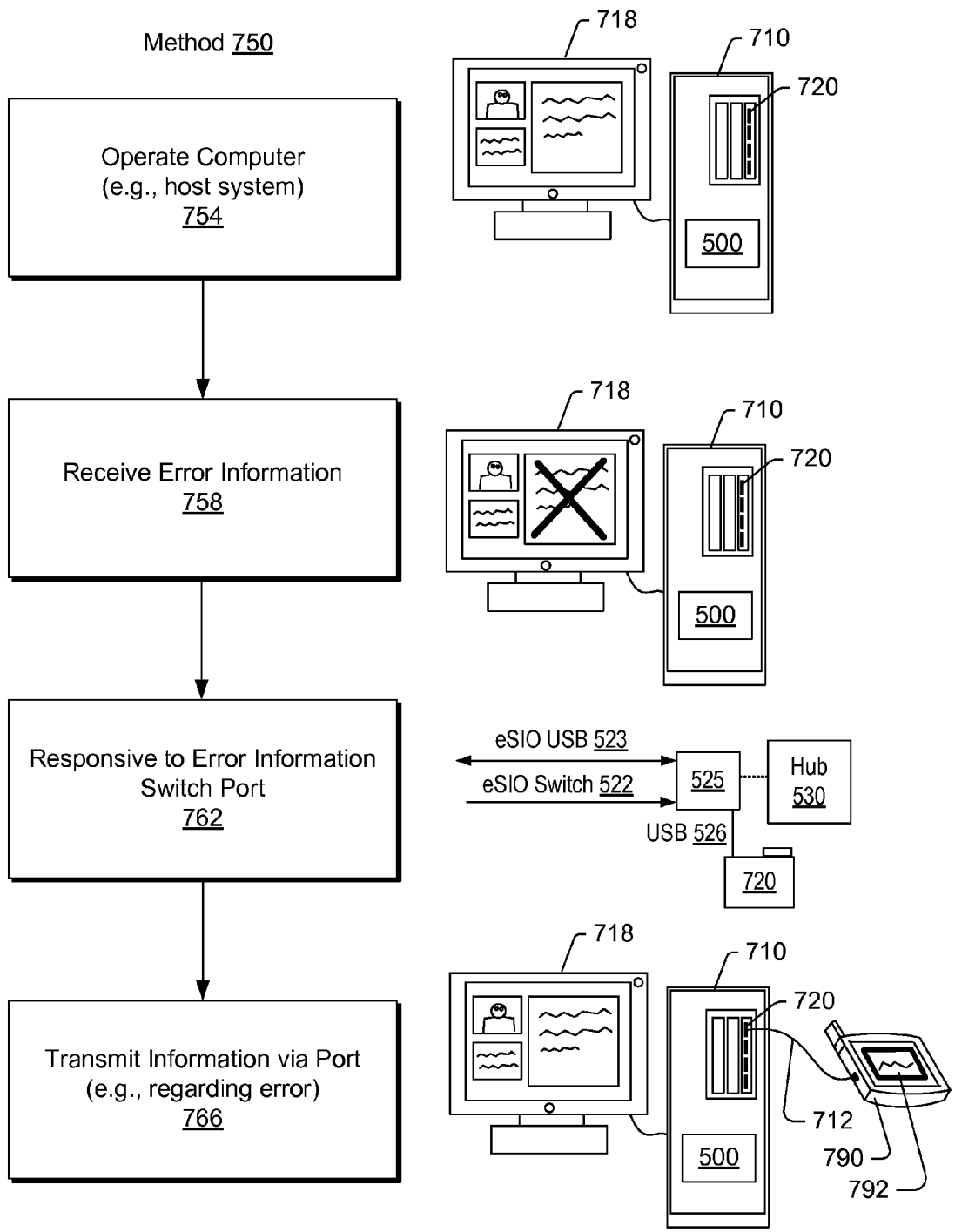
FIG. 7 is a diagram of an example of a method and an example of a computer.

FIG. 7 shows an example of a computer 710 that includes a system such as the system 500. FIG. 7 also shows an example of a method 750. As shown, the computer 710 is operatively coupled to a monitor 718 such that a host system of the computer 710 where, for example, an OS may establish an OS environment to execute one or more applications that include rendering information to the monitor 718. The computer 710 is also shown as being operatively coupled to a device 790 via a cable 712 that is operatively coupled to a port 720 of a series of ports of the computer 710. A portion of the system 500 is also shown as including the lines 522 and 523 between an eSIO and the switch 525 and the switch 525 being operable to switch between the hub 530 and the port 720 (see, e.g., the port 520-1) where data transfer may occur to the port 720 via the USB bus 526.

As an example, the device 790 may be a device that includes a display, a memory device (e.g., a thumb drive, etc.) or other type of device that includes a port configured to operatively couple to the port 720 of the computer 710, for example, via the cable 712. As an example, the device 790 may include one or more applications that execute in an OS environment of the device 790 (e.g., via a processor and memory, etc.). As an example, the device 790 may include a network interface, for example, to transfer and to receive information, optionally under control of an application such as a debugging application, an error reporting application, a "help" application, etc.

Referring to the method 750, it includes an operate block 754 for operating a computer (e.g., a host system of a computer), a reception block 758 for receiving error information germane to operation or lack thereof of the computer, a switch block 762 for switching a port responsive to receipt of the error information or an analysis of at least a portion of the error information, and a transmit block 766 for transmitting information via the switched to port where the information pertains to the error information (e.g., is based at least in part on the error information).

As shown in the example of FIG. 7, a user may possibly become aware of an error that exists in a host system or that impacts operation of the host system, for example, by rendered information locking on the display 718. In a manner that may not include user intervention, a manner that may not include use of the host system, etc., a microcontroller operatively coupled to the system 500 may issue a signal via the switch line 522 to switch the switch 525 (e.g., or to ensure that the switch is switched to a particular state) for transfer of data to the port 720 via the USB bus 526. In such an example, the issuance of the switch signal and switching may occur in an out-of-band manner. Further, data may be transferred via the USB bus 523 to the USB bus 526 and thereby to the port 720 in an out-of-band manner.

As an example, a user may couple the device 790 to the port 720, if not already coupled thereto, and data may be transferred via the port 720 to the device 790 (e.g., via the cable 712). As an example, the device 790 may render at least a portion of the transferred data or information based in part on an analysis thereof to a display of the device 790, for example, in the form of a user interface 792 (e.g., optionally a graphical user interface, "GUI"). The device 790 may include a "help" application that can help a user correct an error to the computer 710. For example, the user interface 792 may instruct the user to power off and on the computer 710. As an example, the user interface may be a website that can assist with debugging of the computer 710, its host system, etc.

As an example, the device 790 may, in response to receipt of error information, transfer data to the system 500 of the computer 710 via the port 720, for example, where such data is directed to the memory 532 via the hub 530 of the system

500 (e.g., via the SPI 537 bus). In such an example, upon a power off and power on cycle, the data may be transferred to one or more host system components of the computer 710, for example, to effectuate debugging, an update, etc. As an example, such data may be a driver for a component of the system, for example, where an outdated driver may have led one or more components of the computer 710 to fail or otherwise operate in an inappropriate manner. For example, a driver may be loaded into the memory 532 (e.g., or instructions for acquisition of a driver via a network connection, etc.) and the driver may be transferred to a PCH, for example, to be handled via BIOS or other environment to perform a driver update (e.g., or to acquire a proper, updated driver, etc.).

As an example, a system can include a power supply unit; a processor; memory operatively coupled to the processor; a chipset operatively coupled to the processor; diagnostic information memory; and a microcontroller operatively coupled to the chipset via a first diagnostic data transfer bus and the microcontroller operatively coupled to the power supply unit and to the diagnostic information memory via a second diagnostic data transfer bus. In such an example, the microcontroller can be an embedded microcontroller of a super I/O. In the aforementioned example, the second diagnostic data transfer bus can be an I2C bus (e.g., a SMBus bus or "SMBus", or a PMBus bus or "PMBus").

As an example, diagnostic information memory may be or include EEPROM. As an example, diagnostic information memory may be or include flash memory. As an example, a system can include a port hub operatively coupled to diagnostic information memory. As an example, a system can include a first diagnostic data transfer bus and a second diagnostic data transfer bus where the second diagnostic data transfer bus operatively couples a port hub and diagnostic information memory.

As an example, diagnostic information memory may include diagnostic information based at least in part on a status of a power supply unit and based at least in part on a status of a processor.

As an example, a method can include receiving diagnostic information via a diagnostic data transfer bus where the diagnostic information pertains to a power supply unit operatively coupled to the diagnostic data transfer bus; analyzing the diagnostic information to generate a diagnostic result that pertains to the power supply unit; transferring the diagnostic result to memory via the diagnostic data transfer bus; and transferring the diagnostic result from the memory to a port hub (e.g., a USB port hub) via the diagnostic data transfer bus. In such a method, the analyzing can include executing instructions on a microcontroller embedded in a Super I/O.

As an example, a method can include switching a switch associated with a port associated with a port hub and transferring diagnostic result to the port in a manner that bypasses the port hub. In such an example, switching can include issuing a switch signal from a microcontroller embedded in a Super I/O to the switch.

As an example, a method can include receiving from a chipset diagnostic information that pertains to a processor operatively coupled to the chipset. In such an example, the method may include analyzing the diagnostic information that pertains to the processor to generate a diagnostic result and transferring the diagnostic result to the memory via a diagnostic data transfer bus.

As an example, a method can include sensing information associated with one or more components of a computer, analyzing at least a portion of the sensed information to generate a thermal management status that pertains to operation of the computer; transferring the thermal management status to memory via a diagnostic data transfer bus; and transferring the thermal management status from the memory to a port hub via the diagnostic data transfer bus. In such an example, sensing may be implemented via one or more sensors. For example, a computer may include one or more voltages sensors, one or more temperature sensors, one or more component condition sensors (e.g., fan rpm, etc.). In such an example, sensed information may be received and analyzed by a microcontroller of a Super I/O (e.g., an eSIO). As an example, an analysis may be performed at least in part by such a microcontroller to determine a thermal management status. For example, consider a status that indicates a fan is operating at a maximum rated rpm, which may indicate that one or more components are generating heat energy excessively. In such an example, information as to temperature and/or voltage may be sensed and received by the microcontroller of the Super I/O. Information received may be analyzed, for example, to determine that a particular component may be generating excessive heat energy and be at risk of an imminent failure.

As an example, information pertaining to one or more voltages, fan failures, temperature excursions, etc., may be received as part of an information sensing routine, optionally in response to an alert where one or more values reaches a limit or limits. As an example, such information may be collected according to an operating mode of a Super I/O, for example, for thermal/power control. Where the Super I/O includes a microcontroller, the microcontroller may access such information and, for example, monitor the information for one or more abnormal conditions and optionally log one or more corresponding diagnostic events (e.g., where an abnormal condition(s) is detected). In such an example, a log may exist in memory operatively coupled to the Super I/O via a data transfer bus and the memory may be accessible via a port. As an example, a computer may include a SMBus (e.g., an I2C, PMBus, etc.) that can transfer sensed information, that can transfer one or more results/statuses based on an analysis of sensed information, and that can transfer one or more results/statuses (e.g., log or logs) to a port (e.g., consider a USB port).

As an example, a system can include a Super I/O that includes a data transfer interface; a memory unit that includes memory and a data transfer interface; a bus that operatively couples the data transfer interface of the Super I/O to the data transfer interface of the memory unit; and a microcontroller embedded in the Super I/O that includes circuitry to receive data via the data transfer interface of the Super I/O, to analyze at least a portion of the data to generate a result, and to transfer the result to the memory unit via the bus. In such an example, the system can include a port hub that includes a data transfer interface that is operatively coupled to the bus and a port switch that switches a connection state of a port operatively coupled to the port hub. In such an example, the microcontroller embedded in the Super I/O can include circuitry to transfer information to the port hub, circuitry to control the connection state of the port switch, and circuitry to transfer information from the Super I/O to the port in a manner that bypasses the port hub.

As an example, a system may include a hypervisor, for example, executable to manage one or more operating systems. With respect to a hypervisor, a hypervisor may be or include features of the XEN® hypervisor (XEN-SOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable storage media. For example, one or more computer-readable storage media can include computer-executable (e.g., processor-executable) instructions to instruct a device. As an example, a computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
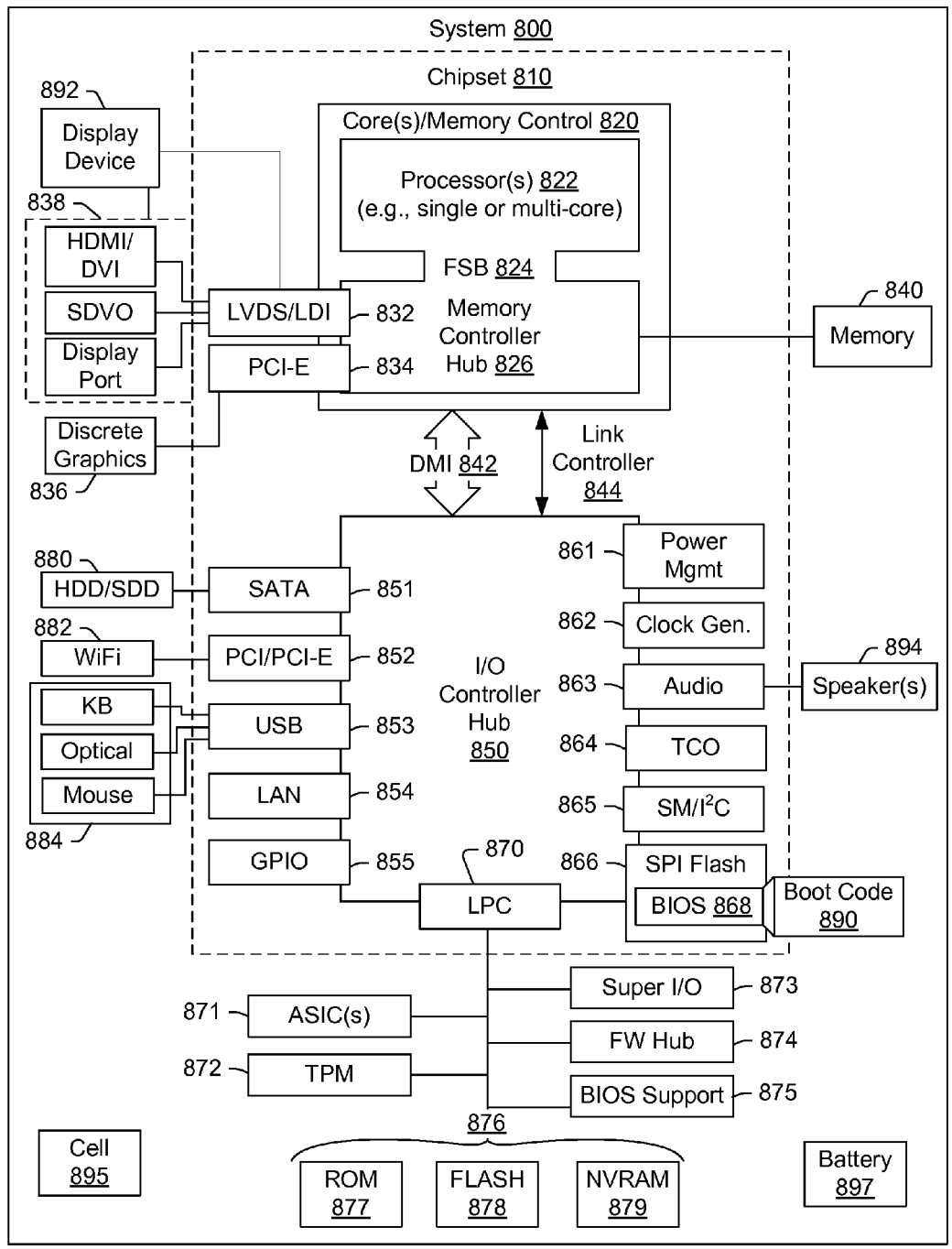
FIG. 8 is a diagram of examples of components that may be components of a computer.

While various examples circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands Intel®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), mice and various other devices (e.g., cameras, phones, storage, media players, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system or component seeking access is the expected system or component.

The system 800, upon power on, may be configured to execute boot code 890 for the BIOS 868, as stored within the SPI Flash 866, and thereafter processes data under the control of one or more operating systems and application software (e.g., stored in system memory 840).

As an example, the system 800 may include circuitry for communication via a cellular network, a satellite network or other network. As an example, the system 800 may include battery management circuitry, for example, smart battery circuitry suitable for managing one or more lithium-ion batteries.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a power supply unit;
a processor;
memory operatively coupled to the processor;
a chipset operatively coupled to the processor;
diagnostic information memory;
a port hub operatively coupled to the diagnostic information memory;
a microcontroller operatively coupled to the chipset via a first diagnostic data transfer bus and the microcontroller operatively coupled to the power supply unit and to the diagnostic information memory via a second diagnostic data transfer bus; and
sensors operatively coupled to the microcontroller,
wherein the microcontroller analyzes at least a portion of sensor data to generate a thermal management status for storage in the diagnostic information memory and for output via the port hub, and
wherein the microcontroller analyzes at least a portion of diagnostic data to generate a diagnostic result for storage in the diagnostic information memory and for output via the port hub.

2. The system of claim 1 wherein the microcontroller comprises an embedded microcontroller of a super I/O.

3. The system of claim 1 wherein the second diagnostic data transfer bus comprises an I2C bus.

4. The system of claim 1 wherein the second diagnostic data transfer bus comprises a SMBus bus.

5. The system of claim 1 wherein the diagnostic information memory comprises EEPROM.

6. The system of claim 1 wherein the diagnostic information memory comprises flash memory.

7. The system of claim 1 wherein the second diagnostic data transfer bus operatively couples the port hub and the diagnostic information memory.

8. The system of claim 1 wherein the diagnostic result is based at least in part on a status of the power supply unit and based at least in part on a status of the processor.

9. A method comprising:
sensing information associated with one or more components of a computer;
receiving diagnostic information via a diagnostic data transfer bus wherein the diagnostic information pertains to a power supply unit operatively coupled to the diagnostic data transfer bus;
analyzing at least a portion of the diagnostic information to generate a diagnostic result that pertains to the power supply unit;
analyzing at least a portion of the sensed information to generate a thermal management status that pertains to operation of the computer;
transferring the diagnostic result to memory via the diagnostic data transfer bus;
transferring the thermal management status to the memory via the diagnostic data transfer bus; and
transferring the diagnostic result, the thermal management status or the diagnostic result and the thermal management status from the memory to a port hub via the diagnostic data transfer bus.

10. The method of claim 9 wherein the analyzing comprises executing instructions on a microcontroller embedded in a Super I/O.

11. The method of claim 9 wherein the port hub comprises a USB port hub.

12. The method of claim 9 further comprising switching a switch associated with a port associated with the port hub and transferring the diagnostic result to the port in a manner that bypasses the port hub.

13. The method of claim 12 wherein the switching comprises issuing a switch signal from a microcontroller embedded in a Super I/O to the switch.

14. The method of claim 9 further comprising receiving from a chipset, diagnostic information that pertains to a processor operatively coupled to the chipset.

15. The method of claim 14 further comprising analyzing the diagnostic information that pertains to the processor to generate a diagnostic result and transferring the diagnostic result to the memory via the diagnostic data transfer bus.

16. A system comprising:
a Super I/O that comprises a first data transfer interface operatively coupled to a power supply unit and a second data transfer interface operatively coupled to at least one sensor;
a memory unit that comprises memory and a data transfer interface;
a bus that operatively couples the first data transfer interface of the Super I/O to the data transfer interface of the memory unit;
a port hub that comprises a data transfer interface that is operatively coupled to the bus; and
a microcontroller embedded in the Super I/O that comprises circuitry to receive data via the first and second data transfer interfaces of the Super I/O, to analyze at least a portion of the data to generate a result, and to transfer the result to the memory unit via the bus for output via the port hub, wherein the result comprises one of a thermal management status based at least in part on sensor information and a diagnostic result based at least in part on power supply information.

17. The system of claim 16 further comprising a port switch that switches a connection state of a port operatively coupled to the port hub.

18. The system of claim 17 wherein the microcontroller embedded in the Super I/O comprises circuitry to transfer information to the port hub, circuitry to control the connection state of the port switch, and circuitry to transfer information from the Super I/O to the port in a manner that bypasses the port hub.

* * * * *